US009320386B2

(12) United States Patent
Hulett et al.

(10) Patent No.: US 9,320,386 B2
(45) Date of Patent: Apr. 26, 2016

(54) METHOD FOR USING A BEVERAGE BREWING APPARATUS

(71) Applicant: Starbucks Corporation, Seattle, WA (US)

(72) Inventors: Randy Hulett, Seattle, WA (US); Brian Shay, Seattle, WA (US); Izaak Koller, Seattle, WA (US)

(73) Assignee: Starbucks Corporation, Seattle, WA (US)

(*) Notice: Subject to any disclaimer, the term of this patent is extended or adjusted under 35 U.S.C. 154(b) by 0 days.

(21) Appl. No.: 14/566,565

(22) Filed: Dec. 10, 2014

(65) Prior Publication Data

US 2015/0093483 A1 Apr. 2, 2015

Related U.S. Application Data

(62) Division of application No. 13/337,685, filed on Dec. 27, 2011, now Pat. No. 8,910,563.

(60) Provisional application No. 61/427,762, filed on Dec. 28, 2011.

(51) Int. Cl.
| *A47J 31/46* | (2006.01) |
| *A23F 5/26* | (2006.01) |
| *A47J 31/06* | (2006.01) |
| *A47J 31/44* | (2006.01) |

(52) U.S. Cl.
CPC .............. *A47J 31/46* (2013.01); *A23F 5/262* (2013.01); *A47J 31/0631* (2013.01); *A47J 31/4475* (2013.01)

(58) Field of Classification Search
CPC ... A23F 5/262; A47J 31/0631; A47J 31/4475; A47J 31/46
See application file for complete search history.

(56) References Cited

U.S. PATENT DOCUMENTS 1,473,898 A   11/1923   Raoul
1,876,474 A    9/1932   S.L.Starkey
(Continued)

FOREIGN PATENT DOCUMENTS

DE   2751310   5/1979
DE   4122547   1/1993
(Continued)

OTHER PUBLICATIONS

European Office Action in European Patent Application No. 11808122.3, filed Jul. 24, 2013, dated Apr. 28, 2014.
(Continued)

*Primary Examiner* — Anthony Weier
(74) *Attorney, Agent, or Firm* — Knobbe Martens Olson & Bear LLP

(57) ABSTRACT

Shown is an apparatus for brewing a beverage, such as coffee, as well as associated methods for brewing a beverage. Apparatuses and methods are shown to reduce labor involved in pour-over brewing techniques, while providing greater consistency in the results. Manual and/or automatic movements are provided to a filter (e.g., rotation) and/or a nozzle dispensing liquid over the filter. Water dosage and timing therefore can be automated to the filter. The nozzle can be positioned off-center with respect to the filter to ensure wetting thereof. The nozzle can be made movable for constrained changes to the path of liquid flow relative to the rotating filter.

27 Claims, 10 Drawing Sheets

(56) References Cited

U.S. PATENT DOCUMENTS

| | | | |
|---|---|---|---|
| 3,971,305 | A | 7/1976 | Daswick |
| 4,662,271 | A | 5/1987 | Woltermann |
| 5,113,751 | A | 5/1992 | Holcomb et al. |
| 5,664,480 | A | 9/1997 | Difilippo |
| 5,865,094 | A | 2/1999 | Kealy |
| 6,098,525 | A | 8/2000 | Gijzel et al. |
| 6,550,370 | B2 | 4/2003 | Dam et al. |
| 6,729,226 | B2 | 5/2004 | Mangiapane |
| 7,673,555 | B2 | 3/2010 | Nosler et al. |
| 2004/0025705 | A1 | 2/2004 | Li |
| 2009/0101233 | A1 | 4/2009 | Owens et al. |

FOREIGN PATENT DOCUMENTS

| | | |
|---|---|---|
| EP | 2144545 | 7/2010 |
| FR | 2608408 | 6/1988 |
| JP | 9-66997 | 3/1997 |
| JP | 2000-308579 | 11/2000 |
| JP | 2001-37642 | 2/2001 |
| JP | 2002219054 | 8/2002 |
| JP | 2005-137543 | 6/2005 |
| JP | 2005-199071 | 7/2005 |
| JP | 2006-142015 | 6/2006 |
| JP | 2006-525067 | 9/2006 |
| JP | 2009-511099 | 3/2009 |
| JP | 2009-165830 | 7/2009 |
| WO | WO 00/57761 | 10/2000 |
| WO | WO 2007/063845 | 6/2007 |
| WO | WO 2010/091872 | 8/2010 |

OTHER PUBLICATIONS

Russian Office Action in Russian Patent Application No. 2013135248, filed Jul. 26, 2013, dated Oct. 15, 2014.
Singapore Office Action in Singapore Patent Application No. 2013047113, filed Jun. 18, 2013, dated Jul. 9, 2014.
PCT Invitation to Pay Additional Fees and, Where Applicable, Protest Fee and Annex to Form PCT/ISA/206 from PCT Application No. PCT/US2011/067420, filed Dec. 27, 2011, dated Sep. 10, 2012.
International Search Report and Written Opinion PCT/US2011/067420, mailed Jan. 2, 2013, filed Dec. 27, 2011.
You Tube video available at http://www.youtube.com/watch?v=L5mvg0mzkb0, uploaded May 9, 2009, printed Mar. 25, 2013.
You Tube video available at http://www.youtube.com/watch?v=uCUwMEmAaJY&NR=1 , uploaded Sep. 15, 2009, printed Mar. 25, 2013.
Blog dated Aug. 4, 2010 discussing Crossland coffee equipment, available at http://web.archive.org/web/20120113220213/http://www.visionsespresso.com/node/1071, printed Mar. 25, 2013.
Office Action in Japanese Patent Application No. 2013-547622, filed Jun. 28, 2013, dated Mar. 9, 2015.
Office Action in European Patent Application No. 11808122.3, filed Jul. 24, 2013, dated Nov. 20, 2014.
Office Action in Chinese Patent Application No. CN 201180063230.7, filed Jun. 28, 2013, dated May 6, 2015.
Office Action in Japanese Application No. 2013-547622, dated Oct. 13, 2015, filed Jun. 28, 2013.

METHOD FOR USING A BEVERAGE BREWING APPARATUS

CROSS REFERENCE TO RELATED APPLICATIONS

This application is a divisional of U.S. patent application Ser. No. 13/337,685, filed Dec. 27, 2011, now U.S. Pat. No. 8,910,563, which claims the benefit of U.S. proviosional patent application No. 61/427,762, filed Dec. 28, 2010. Any and all applications for which a foreign or domestic priority claim is identified in the Application Data Sheet as filed with the present application are hereby incorporated by reference under 37 CFR 1.57.

BACKGROUND

1. Field

The present disclosure generally relates to an apparatus for brewing a beverage, such as coffee or tea, as well as associated methods for brewing a beverage.

2. Description of the Related Art

Many methods and apparatus for brewing beverages through a filter, such as coffee or tea brewed through a filter or bag, are known. One method, described herein as a "pour-over" technique, has become popular with baristas to manually prepare customized beverage recipes in smaller portions for consumption by the coffee or tea connoisseur. The pour-over apparatus and techniques can reduce waste that occurs when a customized recipe is made in a larger portion, such as a full pot, and provide artistic "theater" to the consumer watching the barista deliver personalized service.

A conventional pour-over technique and apparatus typically comprises manually pouring hot water over and into a filter filled with coffee grounds, thus wetting the grounds in the filter and forming a brewed coffee beverage, which subsequently drips through the filter into a single serving container. Conventional "pour-over" apparatus and techniques involve manual, irregularly applied processes that produce cup-sized portions of specialized coffee recipes. An example of a device capable of producing such small servings of coffee is disclosed in U.S. Pat. No. 5,865,094 to Kealy.

SUMMARY

One embodiment provides a beverage brewing apparatus. The beverage brewing apparatus includes a body and a support member engaged with the body. The support member includes a filter holder engagement portion configured to engage with a filter holder. The apparatus also includes a nozzle configured to deliver a fluid over a position of any filter holder engaged with the filter holder engagement portion. The support member further includes a movable element configured such that the filter holder engagement portion can move with respect to the nozzle.

In another embodiment, a beverage brewing apparatus is provided that includes a body and a support member with a filter holder engagement portion configured to engage with a filter holder. The beverage brewing apparatus further includes a nozzle engaged with the body. The nozzle is configured to deliver a fluid over the position of any filter holder engaged with the filter holder engagement portion. Accordingly, the nozzle can move during operation with respect to the filter holder engagement portion.

In yet another embodiment, a method is provided for brewing a beverage. ,The method includes providing an apparatus that includes a body; a support member with a filter holder engagement portion configured to engage with a filter holder, wherein a filter is positioned within the filter holder; and a nozzle configured to deliver a fluid into the filter holder. A fluid is delivered into the filter holder from the nozzle such that the fluid contacts the filter. One or more movable elements are provided and configured such that at least one of the nozzle and the filter holder engagement portion can move with respect to the other of the nozzle and the filter holder engagement portion. The at least one of the nozzle and the filter holder engagement portion is moved with respect to the other of the nozzle and the filter holder engagement portion such that the fluid contacting the filter forms a flowpath along a surface of the filter.

For purposes of the present disclosure and summarizing distinctions from the prior art, certain aspects of the methods and apparatuses have been described above and will be described further below. Of course, it is to be understood that not necessarily all such aspects may be present in any particular embodiment. Thus, for example, those skilled in the art will recognize that the methods and apparatuses may be embodied or carried out in a manner that achieves or optimizes one aspect or group of aspects as taught herein without necessarily achieving other aspects as may be taught or suggested herein.

All of these embodiments are intended to be within the scope of the present disclosure herein disclosed. These and other embodiments will become readily apparent to those skilled in the art from the following detailed description having reference to the attached figures, the present disclosure not being limited to any particular embodiment(s) disclosed.

DETAILED DESCRIPTION

Figure 1:
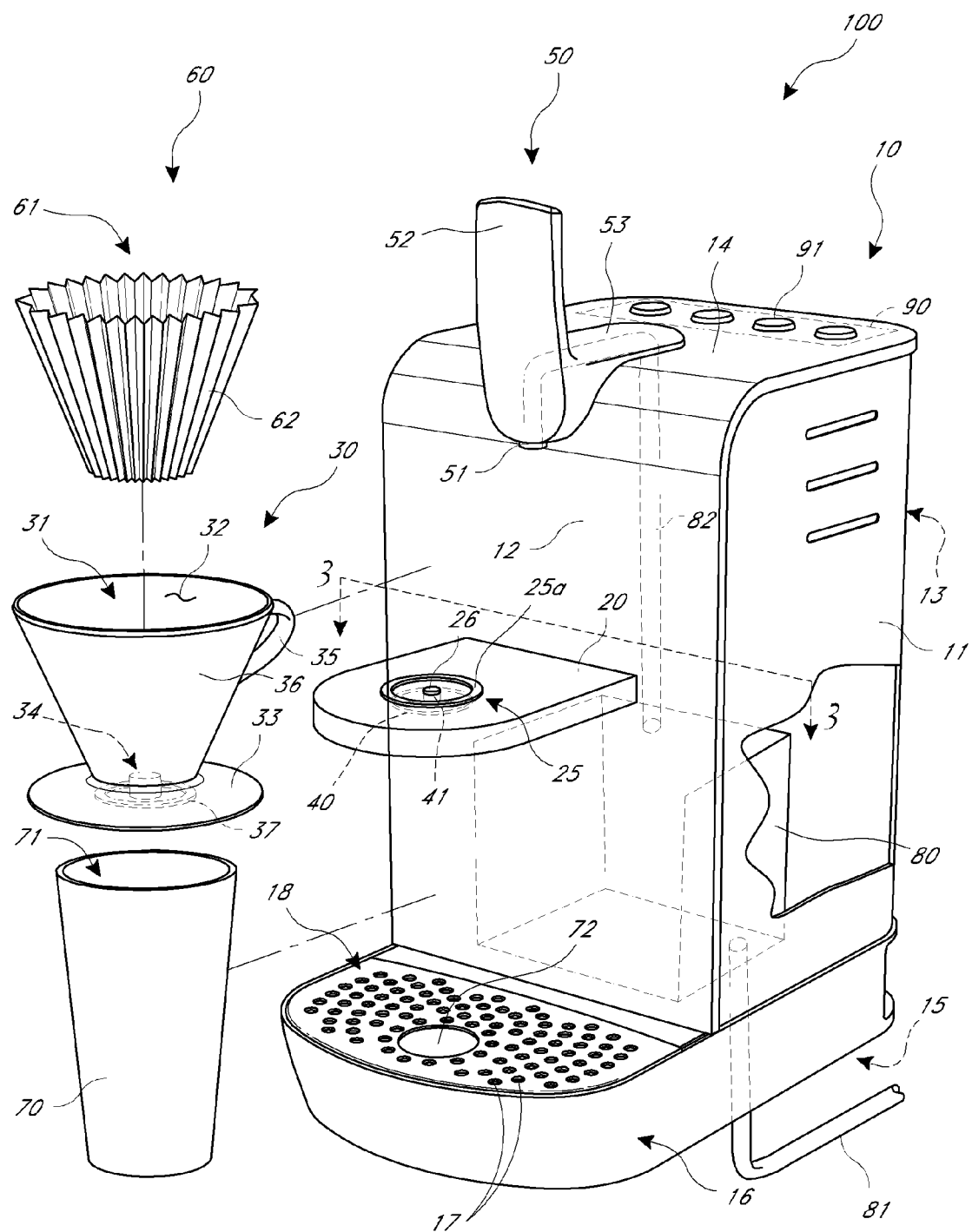
FIG. 1 shows a side and top perspective view of an embodiment of an apparatus for brewing a beverage.

Conventional apparatus used to brew coffee utilizing a pour-over technique is inefficient and inconsistent, because of the manual, individualized, irregular nature of a process used to prepare small quantities of coffee or tea. The manual and labor-intensive nature of conventional pour-over techniques can result in beverages that vary significantly due to the inconsistent pouring techniques and water temperatures used by the baristas. These inefficiencies and inconsistencies are exacerbated in pour-over brewing routines or recipes that use multiple pouring steps. Furthermore, results from manually pouring water to form a fluid flowpath on the coffee filter can vary from cup to cup, even if the same type, grind, and quantity of coffee beans are used, and even with the same barista, due to variations and inconsistencies in the positioning of the water delivery, its timing, shape of flowpath, temperature, etc. Such problems can be further exacerbated when different baristas attempt to repeat a recipe previously ordered by a consumer. Additionally, ergonomic and safety concerns are raised due to the weight of the equipment used by the barista (e.g., the hot water pot), the repetitive nature of the process, and the potential burn hazards posed through manually pouring a hot water pot. Thus, there is a need for apparatuses and methods of brewing a beverage using a pour-over technique that are reliable, repeatable, convenient, safe, and simple to use, while still providing artistic theater.

Embodiments described herein provide apparatuses and methods to reduce labor involved in pour-over brewing techniques, and/or reduce potential ergonomic and safety concerns for the barista, while providing greater consistency in the resulting beverage. For example, manual or automatic movement (e.g., controlled movement) is provided for the filter (e.g., rotation) and/or the nozzle dispensing liquid over the filter to improve or optimize beverage preparation. In addition, apparatus and methods are provided for controlling the flow rate, timing and/or temperature of the fluid from the nozzle through the filter. In particular, water dosage (e.g., flow rate, amount, and/or flow path into the filter), temperature, timing of the fluid delivery and/or the "wait" time before or after fluid delivery, any and all of which can impact the beverage taste and quality, can be controlled and/or automated. For example, the filter can be rotated automatically during liquid dispensation over the filter. In other embodiments, the nozzle can be positioned off-center with respect to the filter to ensure distributed wetting of the beverage flavoring material (e.g., coffee grounds). Additionally or alternatively, the nozzle can be made movable for constrained changes to the path of liquid flow relative to the rotating filter. In yet other embodiments, the temperature of the fluid can be controlled at a point of use (e.g., proximate to the nozzle and/or the filter holder). The flow rate and the amount of the fluid delivered to the filter can also be controlled. The timing of the fluid delivery to the filter and/or the "wait time" or delay between the brewing steps can be controlled, depending on the brewing recipe and/or the type of beverage being made (e.g., coffee, tea, or different types of coffee and/or tea). For example, fluid may be delivered to the filter through a sequence of fluid delivery and time delays to control the fluid level within the filter. Controlling the fluid level within the filter will control the pressure of the fluid on the filter, which controls the extraction time and rate of the flavoring from the flavored beverage material (e.g., coffee or tea). As used herein, the term "recipe" and the embodiments of the apparatuses and methods described to control the recipe and beverage brewing process are not limited to a particular category or subcategory of beverage. Thus, the apparatuses and methods described herein can be implemented to provide greater control of recipes for various categories of beverages (e.g., coffee, tea, etc.), and/or recipes for various subcategories of beverages (e.g., different types of coffee beans and/or tea), and/or for recipes of the same category and/or subcategory (e.g., the same type of coffee bean and/or tea, but with a different recipe to provide different results, by controlling the various aspects of the brewing process described herein).

Although embodiments will be discussed below in terms of an apparatus for brewing a coffee beverage using water and coffee grounds, it will be understood that the apparatus can also be employed to brew other types of beverages, including tea, instant beverages, and any other beverages formed by pouring a fluid (e.g., cold water, hot water, syrup, etc.) into a first container, mixing (e.g., brewing) the fluid with a flavored material (e.g., tea leaves, coffee grounds, etc.) to form a beverage, and providing the beverage from the first container to a second container from which the beverage can be served or further processed. Furthermore, it will be understood that fluid can be provided through the apparatus as described without mixing the fluid with a flavored material. For example, the fluid can be provided through the apparatus without interaction with a flavored material, to preheat one or more portions of the apparatus (e.g., the filter holder or cup) in order to subsequently maintain a consistent brew temperature, to provide a rinsing step, to wet the filter (e.g., seal the filter), and/or to rinse particulates from the filter to improve the beverage taste.

Figure 2:
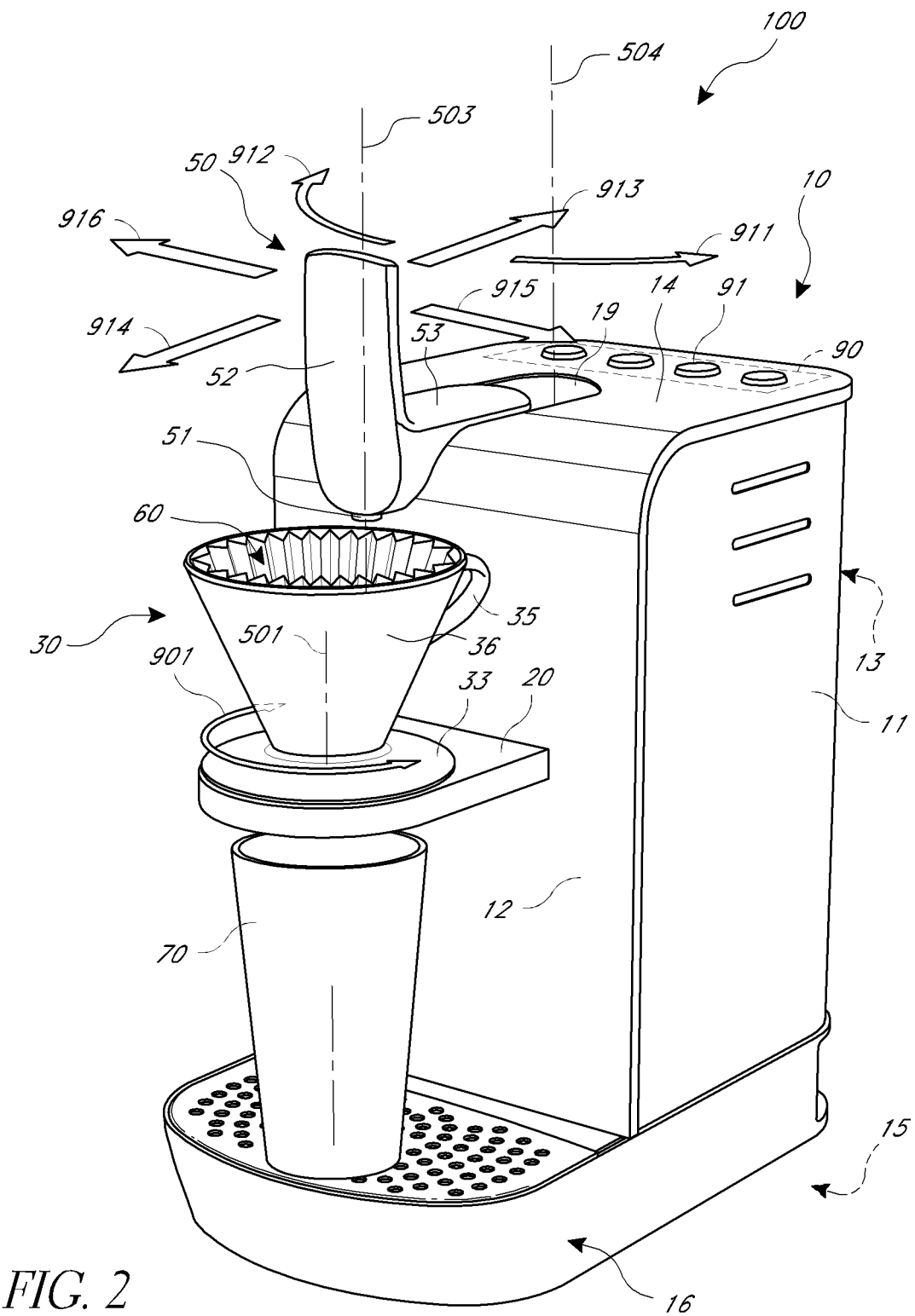
FIG. 2 shows a side and top perspective view of the apparatus shown in FIG. 1.

FIG. 1 shows a side and top perspective view of an embodiment of a beverage brewing apparatus 100. FIG. 2 shows a side and top perspective view of the apparatus 100 shown in FIG. 1 with the parts in place for brewing coffee or other beverage. Referring to FIGS. 1 and 2, apparatus 100 can comprise a housing body or frame 10 and a platform or support member 20 engaged with the body 10. The support member 20 comprises a filter holder engagement portion 25 configured to engage with a filter holder 30 designed to hold a filter 60. The apparatus 100 includes a nozzle 50 configured to deliver a fluid to the filter holder 30. A movable element 40 of the support member 20 allows the filter holder engagement portion 25 to move with respect to the nozzle 50. The apparatus 100 is configured to facilitate a pour-over brewing process that delivers fluid from the nozzle 50 to the filter 60 and the filter holder 30, allowing the fluid to wet and derive flavor from a beverage flavoring material (e.g., coffee grounds, tea, etc.) to form a beverage. The pour-over process flows the flavored fluid through the filter 60 and the filter holder 30, and from the filter 60 and the filter holder 30 to another portion of apparatus 100 (e.g., into a container 70). In the illustrated embodiment, a single serving of the beverage can thus be directly brewed into the serving container for a customer.

The filter holder 30 can comprise any of many different shapes and materials capable of receiving and holding a volume of fluid (e.g., hot water), a flavoring material (e.g., coffee grounds or tea), and a filter, bag, membrane, etc., (e.g., the filter 60). The filter 60 can allow fluid flow, but restrict passage of material through a portion of its thickness. The filter holder 30 can comprise a base 33 and one or more sidewalls, illustrated here as a conical sidewall 36, to form an internal volume within filter holder 30. The sidewall 36 can extend from the base 33 in one or more directions, and/or can extend from an outer perimeter (e.g., circumference) of the base 33, or from an inner portion of the base 33 as shown. In the illustrated embodiment, sidewall 36 extends upwardly from base 33 to form an opening 31, through which fluid and flavoring material can be received, and into which the filter 60 can be inserted. It will be understood that the positioning of the base 33 or a similar structure is not limited to a lowermost extremity of the filter holder 30. The base 33 can be positioned anywhere within an inner perimeter of the sidewall 36 that closes an end of the filter holder 30 (but for an opening to allow the flavored fluid to drip or flow to the container 70 below) to form an internal volume. The filter holder 30 can be separate from the filter 60, or filter holder 30 and filter 60 can be a single, integrated piece. For example, the sidewall 36 of the filter holder 30 can be suitably configured to hold a fluid, with a filter element, screen, or mesh-like structure (e.g., any of the materials and/or structures of the embodiments of filter 60 described herein) integrated within the filter holder 30 to cover aperture 34 and filter fluid flowing through the aperture 34.

The illustrated filter holder 30 forms a substantially inverted frustro-conical shape, as is typical for filter holders, for illustrative purposes only. It will be understood that filter holder 30 can have other shapes. The filter holder 30 can include a handle 35 to facilitate the handling of the filter holder 30 by a user (e.g., a barista). The filter holder 30 can comprise a variety of surface textures, and/or contoured shapes to facilitate handling.

The filter holder 30 can be made from any of many materials, such as metal, glass, ceramic, plastic, etc. The filter holder 30 comprises a hydrophobic (e.g., waterproof) material such that filter holder 30 can hold a liquid and encourages flow toward the opening at the bottom. In one embodiment, the filter holder 30 comprises a material suitable for use with a food product, such as a food product comprising a liquid. The filter holder 30 can comprise an opaque, translucent, or transparent material. It will be understood that the filter holder 30 can comprise any combination of, and/or can be coated with, one or more of the aforementioned materials. It will be understood that the filter holder 30 can comprise any of many different known materials and shapes for known filter holders, mugs, cups, drinking glasses, and the like.

The filter holder 30 can comprise a slot, groove, aperture, tube, sleeve, or other structure that facilitates fluid flow through a lower portion of the filter holder 30. In the illustrated embodiment, an aperture 34 extends through the base 33 to allow passage through the filter holder 30. The aperture 34 is illustrated as a round hole, approximately centered on the base 33. However, it will be understood that the aperture 34 can have other shapes. The aperture 34 can be offset from the center of a top cross-section of the filter holder 30. Moreover, the filter holder 30 can comprise a holding structure to hold and/or engage with a portion of the apparatus 100, as described further below.

In some embodiments, the filter holder 30 can comprise a valve (e.g., a check valve, a two-way valve, a stopper release system, etc.), that can be manually, semi-automatically, or automatically controlled) or similar mechanism that can be configured to restrict and/or allow fluid flow through the filter holder 30. For example, the filter holder 30 can comprise a valve that opens (e.g., manually) when the filter holder 30 is placed onto the apparatus 100 (e.g., to allow flow therethrough), and closes (e.g., manually) when the filter holder 30 is removed from the apparatus 100 (e.g., to prevent any residual liquid contained within the filter holder 30 from dripping during the handling of the filter holder 30 after use). In some embodiments, the filter holder 30 may include a valve configured with a first "closed" position to restrict flow through and hold a volume of fluid within the filter holder 30 (e.g., to allow tea to steep within the filter holder 30). The valve can be configured with a second "open" position to allow the volume of fluid (e.g., the steeped tea) to flow from the filter holder 30 (e.g., to the container 70). The movement of the valve between the first and second position can be actuated manually, semi-automatically, and/or automatically, and in some embodiments, can be actuated by a control system 90 (FIGS. 1-2, 4-6), described further herein. In some embodiments, the filter holder 30 can include a valve with a stopper that restricts flow through the aperture 34 of filter 30, wherein a solenoid actuator utilizing electromagnetic coils can be activated (e.g., electrically activated) to pivot and release the stopper, and allow flow through the aperture 34.

The container 70 can comprise any of many different shapes and materials capable of receiving a fluid flowing from the filter holder 30 through an opening 71 in the container 70. The container 70 can be configured to form an inner volume to hold a volume of fluid (e.g., brewed coffee), which can be served to a consumer or further processed. In the illustrated embodiment, the container 70 is shown with a substantially elongated frustro-conical shape, and without a handle, such as a paper "to go" cup. However, any suitable liquid receptacle can be used, such as a common ceramic coffee mug for in-store consumption.

The apparatus 100 can be used with the filter 60 of any construction suitable to allow fluid to pass therethrough, while retaining the flavoring material. In some embodiments, the filter 60 can be a bag or pouch-like shape (e.g., a tea bag) to enclose the flavoring material therewithin. The filter 60 can be separate from the filter holder 30, or filter 60 and filter holder 30 can be a single, integrated piece, as described further herein. In some embodiments, the filter 60 can comprise a rigid or semi-rigid screen or mesh-like structure. In yet other embodiments, the filter 60 may be of constant or varying thickness. In the illustrated embodiment, the filter 60 comprises a conventional paper filter with a truncated inverted cone-shape and pleats, flutes or corrugations 62 to facilitate the insertion of filter 60 into filter holder 30 and/or form exit channels with the sidewall 36 of the filter holder 30.

It will be understood that although many of the embodiments herein describe the use of the beverage brewing apparatus 100 in conjunction with the filter holder 30, filter 60, and container 70, the apparatus 100 can be manufactured and provided independently without the filter holder 30, filter 60, and/or container 70. In some embodiments, the beverage brewing apparatus 100 can be provided to a user without the filter holder 30, filter 60, and/or container 70, and the filter holder 30, filter 60, and/or container 70 can be separately provided to be used with the apparatus 100. The beverage brewing apparatus 100 and the filter holder 30, filter 60, and/or container 70 can also be supplied as a kit. Alternatively, a kit can include the apparatus 100 and the filter holder 30 configured for use therewith, and the user can separately supply conventional filters 60 and drink containers 70.

It will also be understood that although many of the embodiments herein describe the use of beverage brewing apparatus 100 in conjunction with the use of "fluid" and a beverage flavoring material (e.g., coffee grounds), typically the user will supply these ingredients. Furthermore, "fluid" as used herein is not to be construed as consisting only of a liquid, or of a liquid at a particular temperature. It will be understood that some of the embodiments described herein can be employed with a fluid at a variety of temperatures, and/or that the fluid can comprise a mixture of liquid (e.g., cold water, hot water, syrup, etc.) and vapor (e.g., steam, or steamed milk) or gas infused or mixed within the liquid (e.g., carbonation).

The apparatus 100 can comprise the housing body or frame 10 configured to support, and in some embodiments, protect, various components and features of the apparatus 100. In some embodiments, the body 10 can support one or more containers, such as the filter holder 30 and container 70. The body 10 can be configured to support and/or protect one or more fluid, electrical, and mechanical components or systems, as described further herein. In the illustrated embodiment, the body 10 includes opposed sidewalls 11, a front wall 12, a rear wall 13, a top 14, and a bottom 15, which form an approximately rectangular-prismatic shape. However, the body 10 can have any suitable shape, such as a cylindrical, spherical, semi-spherical, other prismatic shape, etc. that can support and/or protect one or more containers and/or components. The body 10 can comprise a simple frame-like structure with one or more walls and a shelf or platform configured to support a filter holder, allowing a container to be positioned below the shelf and receive fluid flowing from the filter holder. The body 10 can comprise a housing, shell-like, hollow or semi-hollow structure that substantially encloses one or more components therewithin (e.g., a sealed enclosure). In some embodiments, the body 10 can include portions with holes, apertures, mesh, caging, or other features that may protect components within it and be suitable to support a container, without necessarily forming an enclosure. The body 10 can be formed from an integral piece, or from one or more portions configured to engage with each other. Body 10 can be formed from any suitable material, including metals and/or rigid plastics. It will be understood that the sidewalls 11, front wall 12, rear wall 13, top 14, and bottom 15 can comprise the same or different materials.

The apparatus 100 can comprise a base 16 configured to provide support to container 70. The base 16 can be an integral portion of the body 10, or can be separate with respect to the body 10. In the illustrated embodiment, the base 16 is engaged with and extends from a lower portion of a wall (e.g., front wall 12) of the body 10, and has a cross-sectional shape that is approximately rectangular with a curved (e.g., approximately semicircular) end. However, it will be understood that the base 16 can be any suitable shape or material that can provide support for container 70. The base 16 does not necessarily need to be positioned proximate to or attached to the lowermost extremity of the body 10, and can be positioned anywhere relative to the body 10 suitable for supporting container 70, and allowing fluid to flow from the filter holder 30 to the container 70. The base 16 and the container 70 can comprise one or more mating holding structures, as described further herein, to hold the container 70 in place with respect to the base 16. In the illustrated embodiment, the base 16 comprises a pad 72 in a top surface of the base 16 that can serve as a position indicator for placement of the container 70 (e.g., a base of the container 70). The base 16 can be a shell-like, hollow, semi-hollow, semi-solid or solid structure, and can include portions with holes, apertures, mesh, caging, or other features that may provide support to the filter holder 30. The base 16 can be formed from an integral piece, or from one or more portions configured to engage with each other. The base 16 can be formed from any suitable material, such as those described for the body 10.

It will also be understood that the base 16 is optional, and that the container 70 can be supported by a surface separate from the apparatus 100, such as a counter surface on which the apparatus 100 rests while in use.

The base 16 can comprise a reservoir or drain portion 18 (or a combined reservoir and drain) that allows fluid to collect and/or drain from the apparatus 100, while still providing support to container 70. The drain 18 can comprise any of many structures, including a mesh, screen, apertures, slots, etc. that allow fluid to drain therethrough. The drain 18 is illustrated here as comprising a plurality of apertures 17 extending through a top plate of the base 16. The drain 18 can be in fluid communication with an external drain system, to route fluid away from the apparatus 100.

Figure 3:
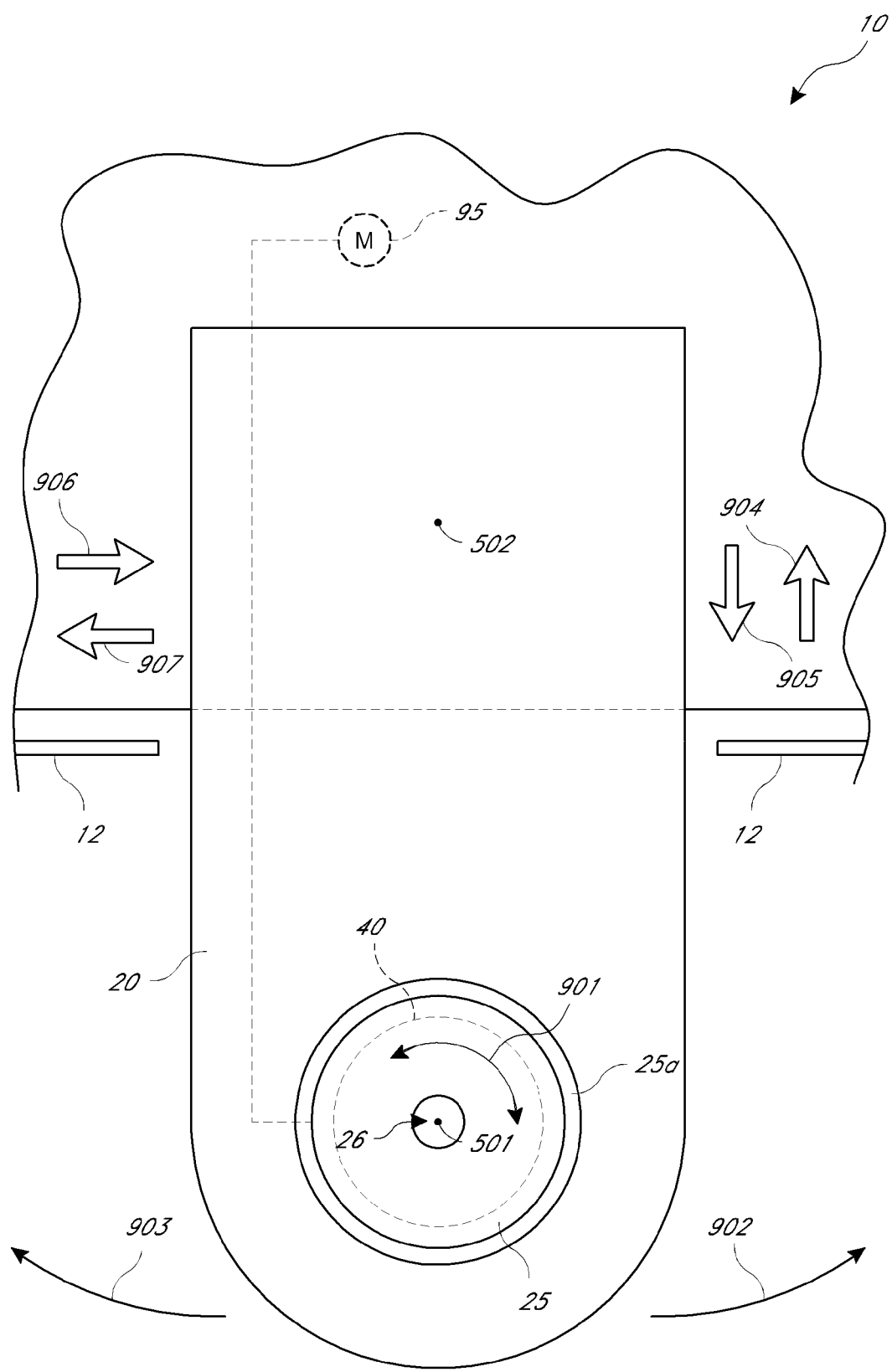
FIG. 3 shows a top cross-sectional view of the apparatus taken along lines 3-3 in FIG. 1.

FIG. 3 shows a cross-sectional view of the apparatus 100 taken along lines 3-3 in FIG. 1. Referring to FIGS. 1-3, the support member 20 can be configured to be attached to or engaged with (e.g., movably engaged with) the body 10. Support member 20 can comprise a number of shapes and materials. In the illustrated embodiment, support member 20 has a cross-sectional shape that is approximately rectangular with a curved (e.g., approximately semicircular) end.

The support member 20 can be attached to the body 10 in a variety of ways, such as with welding, fasteners, adhesive, bonding, and the like. The support member 20 is illustrated as extending outwardly from the front 12 of the body 10 and extending approximately horizontally from an approximate center (e.g., horizontal and vertical center) of the front 12 of the body 10. However, it will be understood that the support member 20 can extend outwardly from various portions of body 10, in a centered or offset position suitable as long as fluid can flow from the nozzle 50 to the filter holder 30 and from the filter holder 30 to the container 70.

The support member 20 can be formed integrally with or separately from a portion of the body 10. In the illustrated embodiment, the support member 20 extends through the front wall 12 of the body 10, and can be attached to or engaged with additional supporting structure within the body 10 (FIG. 3).

The support member 20 can comprise a slot, groove, aperture, or other structure that facilitates fluid flow through a portion of the support member 20 (e.g., through its thickness). In the illustrated embodiment, an aperture 41 extends through the support member 20 to allow fluid to flow therethrough. In some embodiments, the aperture 41 can be configured to engage with a portion of a movable element 40 and/or a portion of the filter holder engagement portion 25, described further herein. The support member 20 can be configured to restrict or facilitate free flow of fluid from filter holder 30 into container 70 and/or drain 18.

In some embodiments, the support member 20 can comprise a valve (e.g., a check valve, a two-way valve, a stopper release system, etc.) or similar mechanism that can be configured to restrict and/or allow fluid flow through the support member 20, similar to the aforementioned mechanism that can be implemented to restrict and/or allow fluid flow through the filter holder 30. Such a valve can be manually operated or operated through the control system 90 (FIGS. 1-2, 4-6), to open, e.g., when fluid is being dispensed and/or when a container 70 is sensed below.

Referring again to FIGS. 1-3, the support member 20 can comprise the filter holder engagement portion 25 configured to engage support member 20 with the filter holder 30. The engagement portion 25 can engage with the filter holder 30 to impart motion to filter holder 30 relative to the nozzle 50 and/or to provide alignment between the aperture 41 through the support member 20 and the aperture 34 through the filter holder 30. The filter holder engagement portion 25 is positioned distally on the support member 20 to allow the filter holder engagement portion 25 to move (e.g., rotate) with respect to the nozzle 50 while the filter holder 30 is engaged with the filter holder engagement portion 25, without interfering with other portions of the apparatus 100 (e.g., body 10). The filter holder engagement portion 25 can extend from, be flush with, or be recessed with respect to a surface of the support member 20. While the filter holder engagement portion 25 can be integrated with the remainder of the support member 20, the filter holder engagement portion is independent from remaining portions of the support member 20, to facilitate relative motion.

The filter holder engagement portion 25 can comprise any of many different shapes and configurations suitable to engage with the filter holder 30. The filter holder engagement portion 25 may be configured such that the filter holder 30 is removably engaged with the apparatus 100, to facilitate cleaning of the filter holder 30, and removal and insertion of the filter 60 and flavoring material to and from the filter holder 30. The filter holder engagement portion 25 can comprise one or more engagement or holding structures (e.g., protrusions, recessions, slots, grooves, snaps, clips, pins, mechanical fasteners, threads, clasps, etc.) configured to engage with one or more corresponding mating holding structures on the filter holder 30. Such paired holding structures can engage with each other (e.g., form a snap fit, friction fit, clasp, etc.), to at least restrict horizontal motion of the filter holder 30 with respect to filter holder engagement portion 25, and allow the filter holder engagement portion 25 to impart movement (e.g., rotation) to the filter holder 30. In some embodiments, the paired holding structures align the opening 34 with the opening 41. In the illustrated embodiment, the filter holder engagement portion 25 can comprise a holding structure 25a configured to form a press fit with a corresponding mating holding structure 37 on the filter holder 30 (FIG. 1). For illustrative purposes, the holding structure 25a is a protrusion (e.g., an annular ring) extending from the top surface of the remainder of the filter holder engagement portion 25, and the mating holding structure 37 is a recess extending into the base 33 of filter holder 30 that can receive holding structure 25a. However, it will be understood that any suitable configuration can be used to engage the filter holder 30 with the filter holder engagement portion 25 in a manner to facilitate imparting motion to the filter holder 30.

The apparatus 100 can be configured such that the filter holder engagement portion 25 and/or filter holder 30 (when engaged to the filter holder engagement portion 25) can move with respect to the nozzle 50, body 10, and/or the remainder of support member 20. Such movement can be facilitated with one or more movable elements. As used herein, "movable element" is used to describe a component or system that is configured to cause relative motion (e.g., rotational, linear, pivoting motion) between two or more components (e.g., between the filter holder 30 and the nozzle 50). As used herein, a movable element can comprise, one or more of, or a combination of, e.g., a hub, bearing, hinge, pin, ball and pinion, axle, rotational joint, clutch, disc, gear, belt, motor, linear slide, linear actuator, track, groove, slot, cam, etc. It will be understood that a movable element is not necessarily tied to an electronic, motorized, or otherwise automatic system, and that embodiments of movable elements described herein can be configured to be moved manually, semi-automatically, and/or automatically (e.g., by a motor). In some embodiments, at least a portion of the apparatus 100 is configured to be moved manually, to provide artistic theater by the barista as part of the pour-over brewing process. In some embodiments, the apparatus 100 can comprise a motor operatively linked to a movable element, wherein the movable element can move in response to the operation of the motor (e.g., a motor 95; FIG. 3). In some embodiments, apparatus 100 can comprise a control system, as described further herein (e.g., the control system 90; FIGS. 1-2, 4-6), wherein the movable element can be configured to move in response to a signal (e.g., an electronic signal) provided by the control system.

Figure 7C:
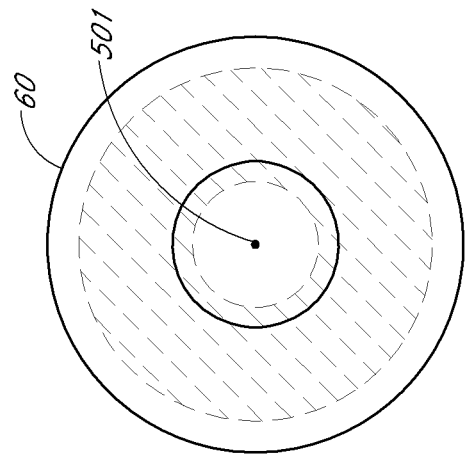
FIGS. 7A, 7B, and 7C show top plan views of embodiments of fluid flowpaths on a filter.
Figure 7B:
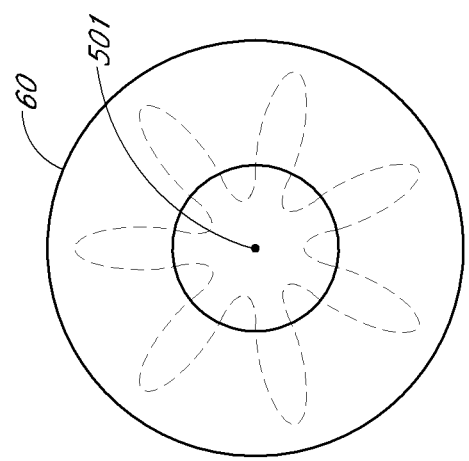
Figure 7A:
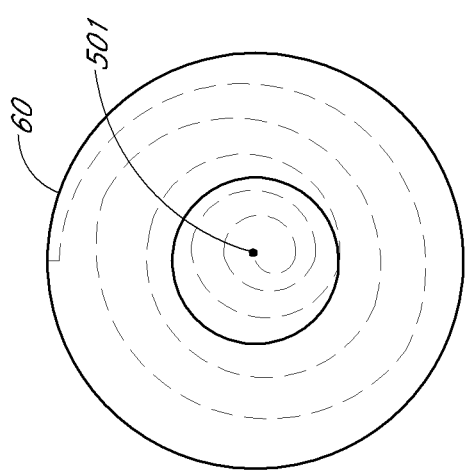

Continuing to refer to FIGS. 1-3, apparatus 100 can comprise the movable element 40 configured such that the filter holder engagement portion 25 and filter holder 30 (when engaged to the filter holder engagement portion 25), can move with respect to the nozzle 50, body 10, and/or the remainder of the support member 20. The movable element 40 may rotate around an axis 501 to impart rotational movement of the filter holder engagement portion 25 with respect to the nozzle 50, body 10, and/or the remainder of the support member 20. Such rotational movement can impart rotational movement to the filter holder 30 about the axis 501, and can be used, for example, to provide a patterned flowpath of fluid as it is delivered from the nozzle 50 to filter 60 (see, e.g., FIGS. 7A-7C). In some embodiments, the movable element 40 can be configured to deliver an annular-shaped flowpath to the filter 60 (FIG. 7C). In some embodiments, movable element 40 can be configured in conjunction with movement of the nozzle 50, to deliver a spiral or wave-shaped flowpath pattern relative to the filter 60 (FIGS. 7A, 7B, respectively). In some embodiments, the engagement between the filter holder 30 and the filter holder engagement portion 25 can be offset, such that the filter holder 30 moves in an orbital motion about axis 501 in response to rotational movement of filter holder engagement portion 25. In some embodiments, the movable element 40 and the filter holder engagement portion 25 can be integrally formed (e.g., from a single, integrated piece). For example, a circular rod or tube extending above a surface of support member 20 can be employed, to engage with filter holder 30 and to facilitate rotation of filter holder 30 around the rod.

The movable element 40 and/or the filter holder engagement portion 25 can be configured with a slot, groove, aperture, etc., extending through its thickness, illustrated here as an aperture 26, to allow fluid to flow from the filter holder 30 to the container 70, similar to the aperture 41 through the support member 20, and the aperture 34 through the filter holder 30. Apertures 41, 34 and/or 26 can be substantially aligned, as shown (e.g., through axis 501, extending through their centers), or can be substantially offset with respect to each other, provided they are configured to allow fluid to flow therethrough.

The support member 20 can itself be a movable element relative to the nozzle 50 in a variety of directions. For example, the distal end of support member 20 can pivot in an arc (arrows 902, 903) about an axis 502 spaced from the distal end of support member 20 (FIG. 3). The support member 20 can also be made movable relative to the body 10 and/or the nozzle 50 in one or more of the linear directions shown by directional arrows 904-907. It will be understood that any such support member motion can replace motion of the nozzle during operation.

Figure 4:
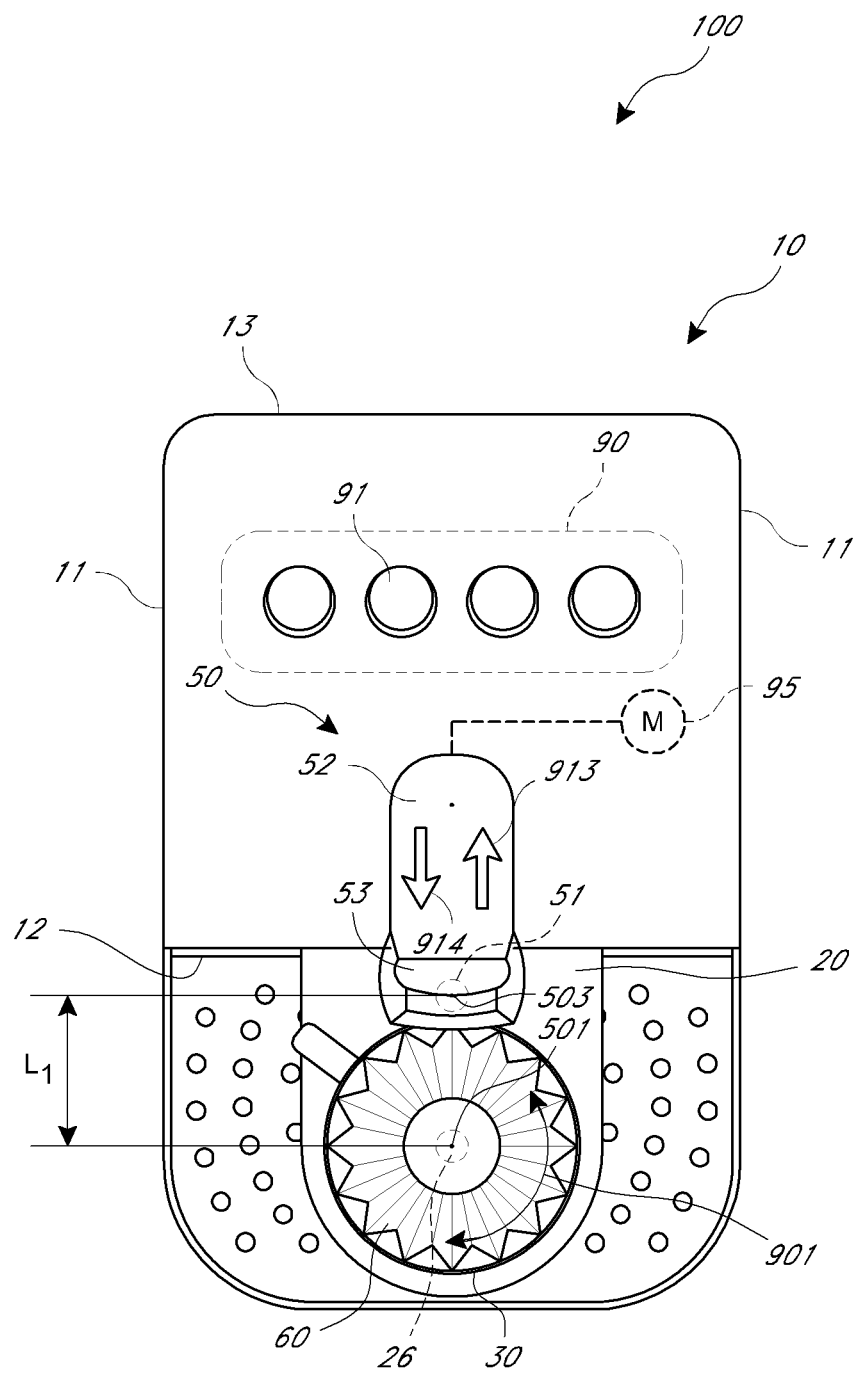
FIG. 4 shows a top plan view of the apparatus shown in FIG. 1 with the nozzle thereof retracted.

FIG. 4 shows a top view of the apparatus 100 shown in FIG. 1. Referring to FIGS. 1, 2 and 4, the apparatus 100 can comprise the nozzle 50 configured to deliver fluid to the filter holder 30 such that the fluid can flow through the filter 60 positioned within the filter holder 30 and to the container 70 or the drain 16. The nozzle 50 can extend from, and in some embodiments, be attached to or engaged with (e.g., movably engaged with) the body 10. The nozzle 50 can comprise an outlet 51 from which fluid can be delivered to the filter holder 30 and/or filter 60. The nozzle 50 can comprise any of many different shapes and/or materials suitable for supporting the outlet 51 and allowing the movement of the nozzle 50 described further herein. In the illustrated embodiment, the nozzle 50 comprises an arm 53 movably engaged with a portion of the body 10 (e.g., the top 14), and a handle 52, which a user can grasp when operating the apparatus 100. Fluid can be delivered to the outlet 51 through a portion of the arm 53 and/or the handle 52, or through a tube mounted externally to the arm 53 and/or handle 52. It will be understood that nozzle 50 (e.g., the arm 53 and/or the handle 52) can comprise one or more curved, angular, or substantially non-horizontal or non-vertical portions along its surface, along its length and/or width, and/or along its longitudinal cross sections.

The nozzle 50 can be movably engaged with the body 10 in a variety of ways, such as by employing one or more of the aforementioned movable elements. The nozzle 50 can be configured to be manually moved (e.g., by a barista), or semi-automatically or automatically moved (e.g., with a motor, actuator, robot, or other automation component). The nozzle 50 can be movably engaged with the body 10 through any rigid or semi-rigid structure that can be configured to deliver fluid from and provide support to the outlet 51. The nozzle 50 can comprise a flexible, but semi-rigid structure that can be moved by an external force (e.g., flexed or bent), and then retain the position when the force is removed (such as a lamp "gooseneck"). The nozzle 50 can comprise a pipe or tube (e.g., a rigid pipe or tube), with a movable (e.g., pivotable or rotatable) coupling attached on its proximal end to a portion of the body 10 (e.g., the top 14).

Figure 5:
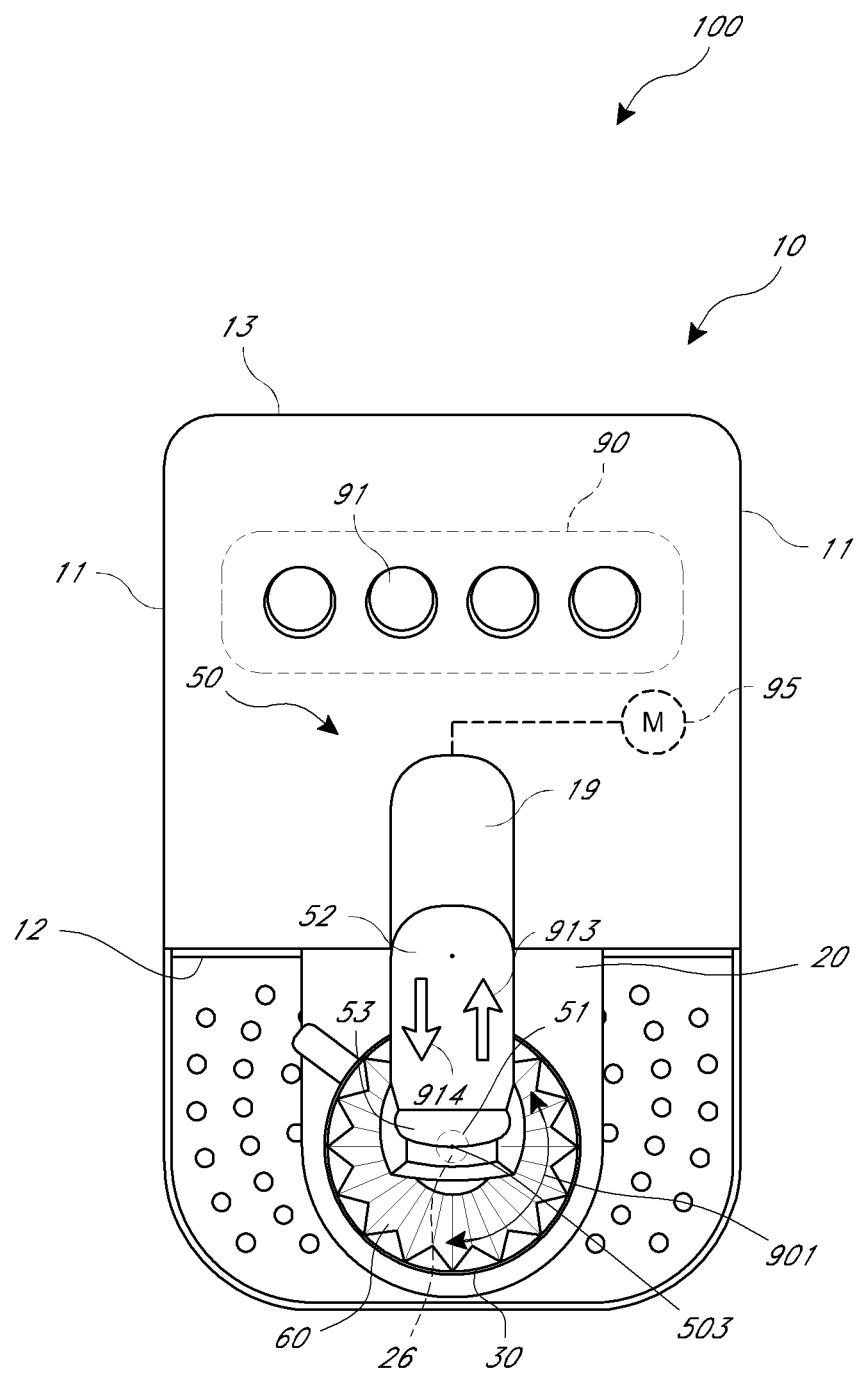
FIG. 5 shows a top plan view of the apparatus shown in FIG. 1 with the nozzle thereof extended for dispensing water over a filter.

The nozzle 50 can be movably engaged with the body 10 to facilitate movement of the nozzle 50 relative to body 10 and/or support member 20 (e.g., relative to the filter holder engagement portion 25, and/or filter holder 30 and/or filter 60, when filter holder 30 is engaged with filter holder engagement portion 25). In the illustrated embodiment, the nozzle 50 employs a linear movement along a track, linear actuator, slide, and the like, which allows the nozzle 50 to move approximately linearly a distance $L_1$ relative to the body 10 and/or support member 20 (e.g., in the directions shown by directional arrows 913-914). As such, the nozzle 50 can be extended and retracted relative to the body 10. The nozzle 50 can be extended and retracted to provide flexibility in positioning the nozzle 50 relative to the filter holder engagement portion 25, to place the apparatus 100 in an "enabled" or "disabled" state, and/or to provide greater access to the filter holder 30 and/or the filter 60 (e.g., for cleaning, removal and/or replacement of the filter holder 30, the filter 60, and/or the beverage material). FIG. 4 illustrates a position of the apparatus 100 with the nozzle 50 in a retracted position, and FIG. 5 illustrates the nozzle 50 in an extended position. In the illustrated embodiment, the nozzle 50 is movably engaged with the body 10 within a track 19 (FIGS. 2 and 5).

Some, most or all of the nozzle 50 can be configured to be adjacent to, proximate to, extending from, recessed into, flush with, and/or enclosed within a portion of the body 10 (e.g., relative to any one or more of the sides 11, front 12, top 14, and back 13). For example, the nozzle 50 can extend through a wall (e.g., the front wall 12) of body 10, and move out of and into the body 10 as the nozzle 50 is extended and retracted. The nozzle 50 is illustrated extending from and sliding along a track in the top 14 of the body 10.

The center of the nozzle outlet 51 (and the axis 503) are typically positioned outside the perimeter of the filter holder 30 and the filter 60 when the nozzle 50 is in a retracted position (FIG. 4). However, it will be understood that the nozzle 50 can be in a retracted position when the nozzle outlet 51 is positioned outside or inside the perimeter of the filter holder 30 and the filter 60. In some embodiments, the apparatus 100 is in a "disabled state" when the nozzle 50 is in a retracted position. As used herein, "disabled state" refers to an electronic or mechanical means that prevents a portion of the apparatus 100 from operating. For example, the apparatus 100 can be configured to prevent the flow of fluid to the nozzle 50 and/or can prevent the movement of the filter holder engagement portion 25 when the apparatus 100 is in a disabled state. As used herein, "enabled state" refers to an electronic or mechanical means that allows a portion of the apparatus 100 to operate. The apparatus 100 can be configured to allow the flow of fluid to the nozzle 50 and/or can allow the movement of the filter holder engagement portion 25 when the apparatus 100 is in an enabled state. The apparatus 100 can be configured to change from a disabled state to an enabled state when the nozzle 50 is moved from a retracted to an extended position.

Referring to FIGS. 4 and 5, the nozzle 50 can be configured to be movable along the track 19, in the directions shown by the arrow 914, to an extended position a distance $L_1$ from the retracted position. It will be understood that during use, the nozzle 50 can be extended to a variety of distances $L_1$ above the filter 60, including any intermediate positions between a fully retracted and fully extended state. For example, the nozzle 50 can be moved to an extended position by moving nozzle outlet 51 over the filter 60 and the filter holder 30 such that the axis 503 is within the perimeter of the filter 60 and the filter holder 30. The nozzle 50 can be moved to an extended position substantially aligned with and/or a position substantially offset (e.g., radially offset) from one or more of the center of the filter 60, filter holder 30, and/or filter holder engagement portion 25. Referring to FIG. 5, nozzle 50 can be extended such that the centers of the filter 60, filter holder 30, and filter holder engagement portion 25 (e.g., axis 503) can be aligned with the nozzle outlet 51 (e.g., axis 501). It will be understood that the movement of nozzle 50 is not limited to the extended position shown in FIG. 5, and can be extended beyond the center of filter 60, filter holder 30, and filter holder engagement portion 25, to the outermost edge of filter 60. In some embodiments, when nozzle 50 is moved from a retracted position to an extended position, an electronic signal or other signal or mechanism is triggered to place one or more features within apparatus 100 in an "enabled state" from a "disabled state." In some embodiments, one or more indicator lights are activated to illustrate whether apparatus 100 is in an enabled state or a disabled state.

It will be understood that the apparatus 100 can be configured to facilitate one or more of the movement of the nozzle 50 and the movement of the filter holder engagement portion 25 (and the filter holder 30 and filter 60, if engaged therewith) described herein. Further, the movement of the nozzle 50 and the movement of the filter holder engagement portion 25 can be performed independently, or simultaneously. Additionally, the delivery of fluid from the nozzle 50 can be timed relative to one or more of the movement of the nozzle 50 and the movement of the filter holder engagement portion 25 to form a variety of continuous or intermittent flowpaths with a variety of flowpath patterns on the filter 60. In some embodiments, a first portion of fluid can be delivered to the filter 60, and then a second portion of fluid can be delivered to the filter 60 after a delay, to allow the first portion to brew and drain into the container 70.

In some embodiments, the first and second portions of fluid can have the same or different flowpaths. For example, a different flavor might result from a "center pour," a "donut pour," a "coil-shaped" pour and/or an "edge pour" (e.g., delivered proximate to an outer circumferential edge of the filter 60) at varying stages of the brew cycle. In some embodiments, a rinse cycle can be implemented prior to placing coffee grounds in the filter 60, e.g., to seal the filter 60 to filter holder 30, and/or to wash away any particulates (e.g., paper) on the filter 60 that may provide undesirable flavor to the finished beverage.

FIGS. 7A-7C show top plan views of embodiments of fluid flowpaths on the filter 60. FIG. 7A illustrates an example of a spiral-shaped flowpath formed on the filter 60. The spiral-shaped flowpath can be formed by introducing fluid to nozzle 50, when nozzle 50 is either positioned proximate to an outer edge of filter 60, or the center axis 501 of filter 60. After the fluid is introduced, the nozzle 50 can be moved linearly in one direction as the filter 60 is being rotated, as described above, to form the illustrated spiral-shaped flowpath.

FIG. 7B illustrates a wave-shaped flowpath formed on the filter 60. The wave-shaped flowpath can be formed by delivering a fluid to a portion of the filter 60, and reciprocating the nozzle 50 several times while the filter 60 is being rotated through 360°, as described above, to form the illustrated wave-shaped flowpath.

Figure 6:
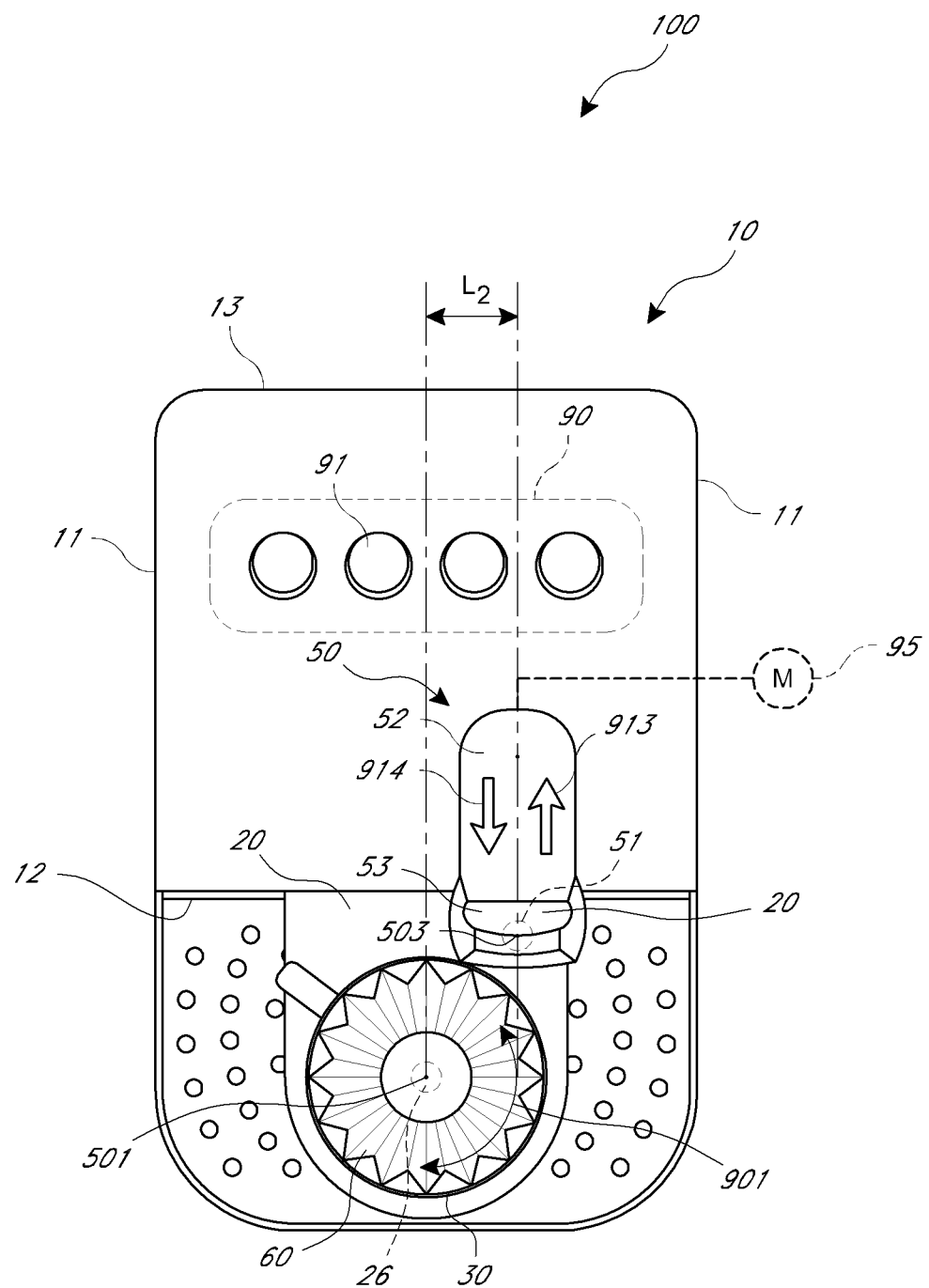
FIG. 6 shows a top view of the apparatus shown in FIG. 1.

FIG. 7C illustrates a donut or annular-shaped flowpath formed on the filter 60. The annular or donut-shaped flowpath can be formed by positioning the nozzle 50 to deliver a fluid to a portion of the filter 60 between the outer edge of the filter 60 and the center of filter 60 (i.e., laterally off-center; as shown in FIG. 6 and described further below, and with the nozzle outlet 51 positioned over the filter 60), and rotating the filter 60 without moving the nozzle 50. Referring to FIGS. 4 and 5, the donut-shaped flowpath can also be formed by moving the nozzle 50 over the filter 60 to a position between the retracted and extended position, and subsequently delivering fluid to the filter 60 while holding the nozzle in that position and rotating the filter 60.

Referring again to FIGS. 4 and 6, it will be understood that although the nozzle 50 is shown in FIG. 4 approximately laterally centered relative to a side of body 10 (e.g., top side 14), it will be understood that nozzle 50 can be positioned so that nozzle 50 is offset a distance $L_2$ from the center of a side of body 10 (e.g., top side 14; FIG. 6). The embodiment shown in FIG. 6 can provide either of the donut or wave-shaped flowpaths described herein (FIGS. 7B and 7C).

It will also be understood that nozzle 50 can be configured to move in any of many different directions. For example, the nozzle 50 can be configured to pivot in an arc (arrows 911, 912) about an axis 504 spaced from the distal end of nozzle 50 (FIG. 2). Nozzle 50 can be configured to move in one or more of the linear directions shown by directional arrows 913-916 (FIG. 2). Desirably, the nozzle 50 motion is constrained, however, to remain over the filter 60 during dispensation.

Referring again to FIG. 1, a fluid distribution and/or temperature regulation system 80 can be employed to regulate the distribution and/or temperature of the fluid being delivered to the nozzle 50. System 80 can control, for example, the flow rate and/or the timing of the fluid being delivered from the nozzle 50 into the filter holder 30 and filter 60. For example, the system 80 can control the sequencing and steps in the delivery of the fluid into the filter 60 to control the fluid level within the filter 60 and/or to control the extraction time and rate of the flavoring from the flavored beverage material (e.g., coffee or tea).

The regulation system 80 can comprise one or more of a heater, cooler, manifold, valves, pipes, tubes, timers, thermostats, flow controls, pressure regulators, sensors (e.g., pressure, flow and/or temperature transducers), etc. The regulation system 80 can further comprise a boiler in fluid communication with the nozzle 50 and configured to provide hot fluid to the nozzle 50. In some embodiments, various aspects of the regulation system 80 can be integrated within other components of apparatus 100. For example, heaters can be integrated into the filter holder 30 to provide "point of use" temperature control of the fluid within the filter holder 30. The heaters can communicate with a control system (e.g., a remote control system) separate from the filter holder 30 through a connector or plurality of contacts positioned on the base 33 of the filter holder 30 that connect to or contact a corresponding connector or plurality of contacts positioned on the support member 20. In another embodiment, a temperature regulation system can be integrated within an upper portion of apparatus 100 (e.g., an upper portion of body 10, and/or within nozzle 50) to provide "temperature on demand" temperature control of the fluid being delivered to the filter holder 30. Such "temperature on demand" temperature control can provide greater control of the temperature of the brewing (or steeping) process, providing greater control over the quality of the coffee or tea recipe. One or more temperature sensors can be implemented within apparatus 100 (e.g., proximate to the point of use of the fluid, e.g., within the nozzle 50 and/or the filter holder 30) for any of the temperature control systems described herein. The one or more temperature sensors can provide feedback to a temperature regulation system (e.g., the system 80), in an open or closed loop configuration, to provide improved temperature control of apparatus 100. Further embodiments of "temperature on demand" temperature control and other beverage brewing apparatuses and methods that can be implemented with embodiments of the apparatuses and methods described herein are disclosed in U.S. Pat. No. 7,673,555 to Nosler et al., the entirety of which is incorporated by reference herein.

The regulation system 80 can be supplied with fluid from a fluid supply 81 and can deliver fluid to the nozzle 50 through one or more hoses 82. The one or more hoses 82 may be flexible, or may include one or more flexible pipe couplings, to allow the nozzle 50 to move relative to the system 80. The apparatus 100 can also include one or more valves and/or flow regulators (e.g., flow restrictors) in fluid communication with the regulation system 80 and the one or more hoses 82 to provide a variable flow rate of fluid to the nozzle 50.

Figure 8:
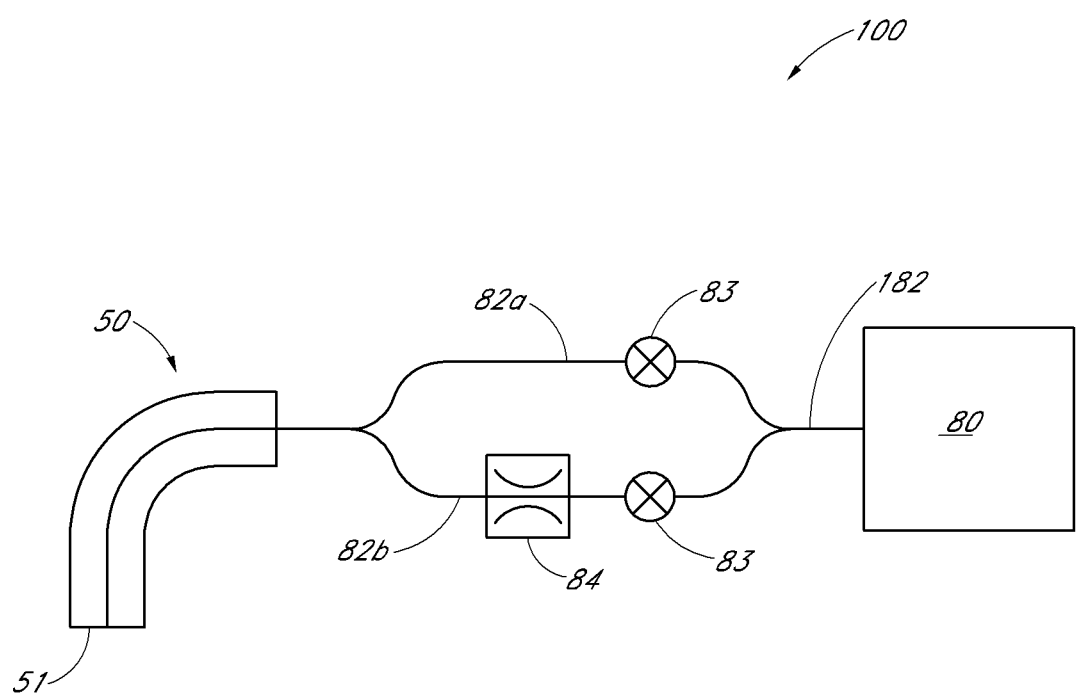
FIG. 8. shows a schematic view of an embodiment of a portion of a regulation system that can be implemented within the apparatus of FIG. 1

FIG. 8 shows a schematic view of an embodiment of a portion of the regulation system 80 that can be implemented within the apparatus of FIG. 1. Regulation system 80 can comprise a hose 182 that is similar to hose 82. In this embodiment, the hose 182 can branch or split into two flow paths (e.g., hose sections) 82a and 82b through a "T" connection, "Y" connection, distribution manifold, or the like, positioned downstream of the system 80. One or more valves 83 can be implemented within the hose sections 82a and/or 82b, downstream of the system 80 and the "T" or "Y" connection, to restrict and/or allow the flow through the hose sections 82a and/or 82b. One or more flow regulators (e.g., flow restrictors) can be implemented within the hose sections 82a and/or 82b (upstream or downstream of valves 83) to allow the flow rates of the fluid flowing through the hose sections 82a, 82b, respectively, to be controlled with respect to each other. In the illustrated embodiment, the hose section 82b includes a flow regulator 84 to allow the flow rate of the fluid through the hose section 82b to be regulated to a different (e.g., lower) flow rate than the flow rate of the fluid flowing through the hose section 82a. An optional "T" or "Y" connection can be implemented downstream of the hose sections 82a and 82b to allow a single stream of fluid to flow through nozzle 50. In some embodiments, the hose sections 82a and 82b terminate within nozzle 50, without a "T" or "Y" connection. In use, the valves 83 can be activated or deactivated to allow the fluid flowing through system 80 to nozzle 50 to be delivered at various discrete flow rates depending on whether either or both the valves 83 are activated. Thus, the embodiment shown in FIG. 8 can facilitate, for example, a higher flow rate to be used in a rinse sequence by allowing the flow through the valve 83 in the hose section 82a and restricting the flow through the valve 83 in the hose section 82b. A lower flow rate to be used, for example, in a brewing or steeping sequence can be facilitated by allowing the flow through the valve 83 in the hose section 82b and restricting the flow through the valve 83 in the hose section 82a.

Some, most, or all of the regulation system 80 can be positioned within the body 10 as shown (FIG. 1) and/or separate from the body 10. In another embodiment, the apparatus 100 comprises a cold water supply and a hot water supply to the nozzle 50 that can be mixed proximate to the nozzle 50 to provide temperature-on demand for the water flowing from the nozzle 50.

Returning to FIG. 1, the regulation system 80 can be controlled by a control system 90 to control various features of the pour-over process provided by the apparatus 100. The control system 90 can be controlled electronically, but can comprise other types of control systems such as pneumatic or hydraulic. The control system 90 can comprise any of many configurations known in the art, and can include any of a variety of controllers, user interfaces, buttons (e.g., buttons 91), switches, circuits, and the like. The control system 90 can control the power to the apparatus 100, the distribution, timing, and/or temperature of the fluid being delivered to the nozzle 50, and any other valves, motors, heaters, coolers, timers, thermostats, flow controls, pressure regulators, sensors (e.g., pressure, flow and temperature transducers) and the like employed in the pour-over process. The control system 90 can be hard-wired to the apparatus 100 and its components, or can be configured to control apparatus 100 and its components wirelessly. The control system 90 can be attached to a portion of body 10 (e.g., on top 14, sides 11, front 12, or back 13), or can be separate from body 10. Control system 90 can be configured to control various aspects of the apparatus 100 remotely (e.g., through a telecommunication system, wirelessly, and/or an additional control system that sends a control signal to control system 90, etc.), that allow a user to remotely interact with and control one or more apparatuses 100 and their components, e.g., from a central station. In some embodiments, control system 90 can be used to program and save various coffee recipes, based upon the sequence, timing, and/or movement of the fluid delivery into the filter 60 from the nozzle 50, and/or based upon specific types of coffee and/or grind size.

Figure 9:
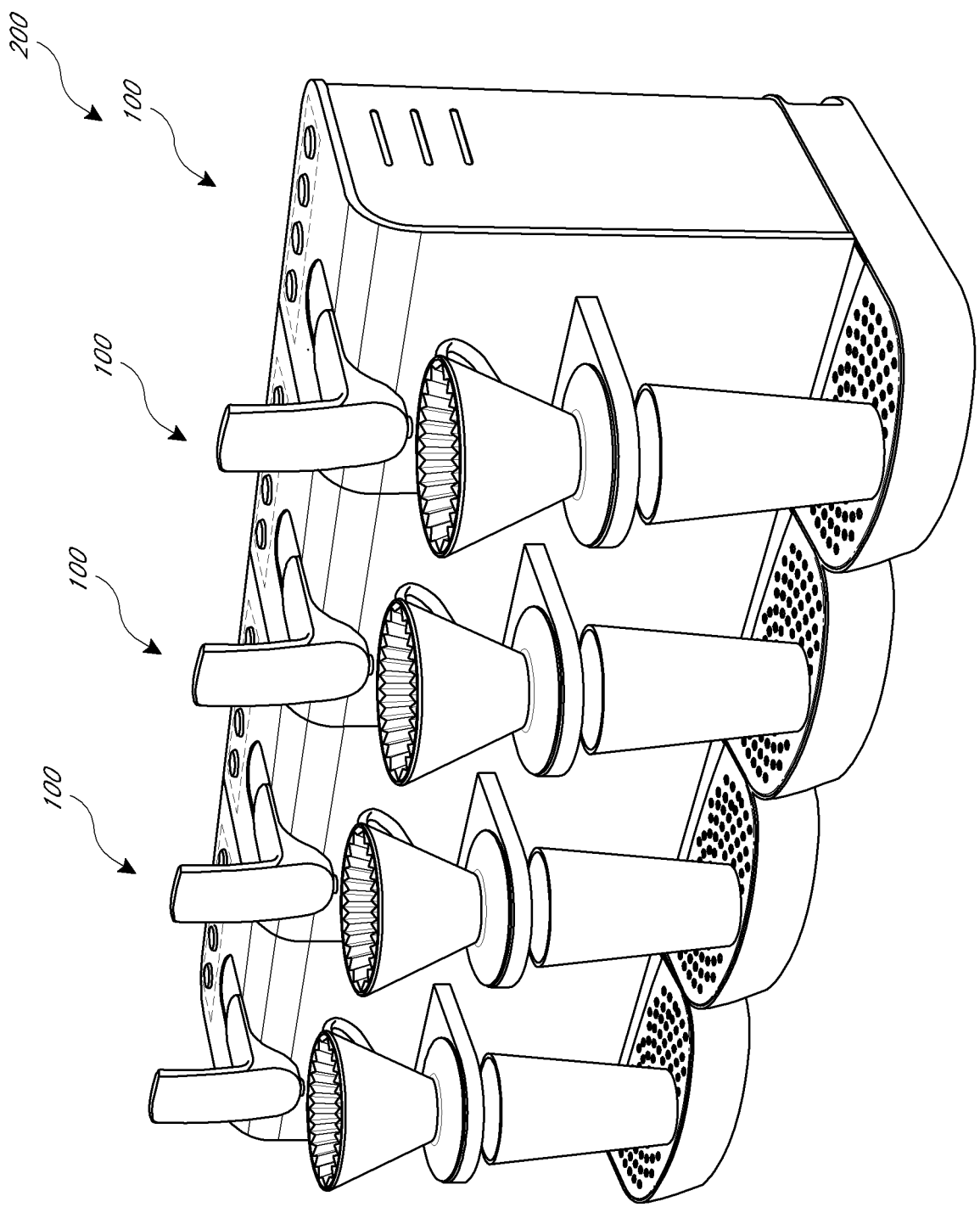
FIG. 9 shows a side and top perspective view of an embodiment of an apparatus for brewing a plurality of beverages.

FIG. 9 shows a side and top perspective view of an embodiment of an apparatus 200 for brewing a plurality of beverages. The apparatus 200 can comprise two or more of the single-serve apparatus 100 (FIGS. 1-6) attached to or integrated with each other. The apparatus 200 can be configured such that each of the single-serve apparatuses 100 can be controlled through a single control system and/or user interface, or through a common control system and/or user interface. The multiple-serve apparatus 200 can be configured to include individual controllers, fluid distribution and/or temperature control systems, drains, fluid supplies, support members, and/or housings, or can share a common controller, fluid distribution and/or temperature control system, drain, fluid supply, support member, and/or housing. The apparatus 200 can be configured to include individual nozzles to deliver fluid to each of the apparatuses 100, or can be configured with a single nozzle configured to move horizontally along the apparatus 200 to deliver fluid to two or more of the single-serve apparatuses 100. The apparatus 200 can be configured to provide the same or different processes for each of single-serve apparatuses 100.

Figure 10:
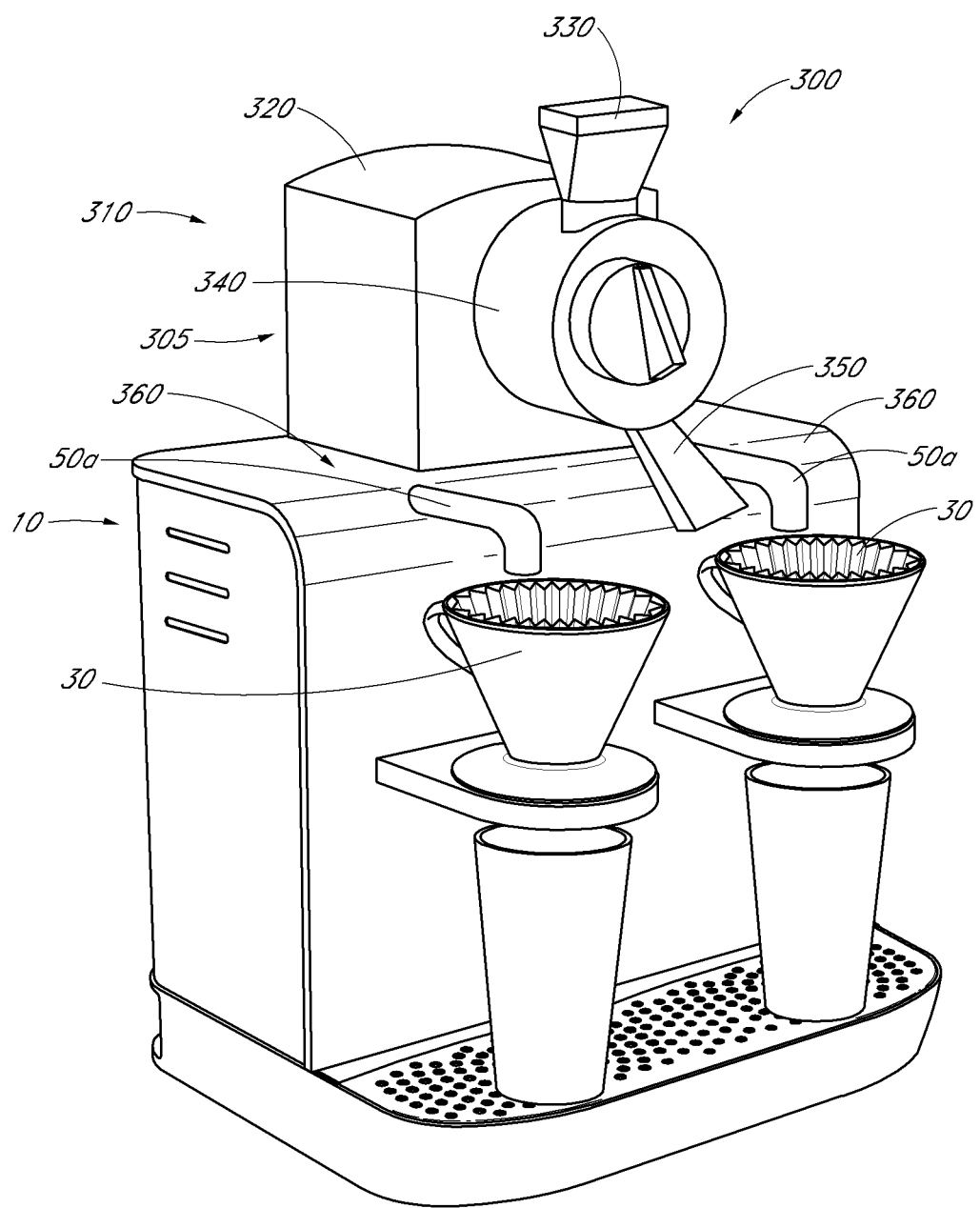
FIG. 10 shows a side and top perspective view of an embodiment of a multiple beverage brewing with an integrated grinder.

FIG. 10 shows a side and top perspective view of an embodiment of an apparatus 300 for brewing a plurality of beverages. The apparatus 300 can be substantially similar to and can function substantially similar to apparatus 100 (FIGS. 1-6) and 200 (FIG. 7) with a few exceptions as described below. In the embodiment shown in FIG. 10, the apparatus 300 comprises two of the single-serve apparatus 100 (FIGS. 1-6) attached to and integrated with each other to form a lower body portion 360. The apparatus 300 further comprises an integrated grinder 310 with a body 305 attached to the lower body portion 360. The grinder 310 can be operated under control of one or more control systems of apparatus 300. The grinder 310 can also be configured to receive a material (e.g. coffee beans) through a compartment or hopper 330, grind the material in a grinder mechanism 340 to form a ground material (e.g., coffee grounds), and deliver the ground material from the grinder 310 through an outlet 350. The hopper 330 can be any of many configurations suitable for holding one or more types of coffee beans (e.g., a single, dual or other partitioned hopper), and delivering them into the grinder mechanism 340. The grinder mechanism 340 can include any of many components and configurations, such as a motor, blades, and/or other various mechanical and electrical devices, or combinations thereof, suitable to grind a material, automatically, semi-automatically, and/or manually. The outlet 350 can comprise one or more chutes, funnels, etc., suitable to deliver the ground material from the grinder 310. For example, grinder 310 can comprise a separate chute to deliver ground material to each of the filter holders 30. In some embodiments, a single outlet 350 can be configured to deliver the ground material to two or more of the filter holders 30, by moving (e.g., pivoting) the outlet 350 (manually, semi-automatically, or automatically) from a position above one of the filter holders 30 to a position above another of the filter holders 30. The sequences and operation of the grinder 310 can be automatically controlled and sequenced into the remainder of the brewing cycle, and can be controlled separately from, or in combination with, the other pour-over sequences, controls, and coffee recipes described herein for apparatuses 100 and/or 200. For example, some brewing sequences can include a rinse element (to rinse filter 60, FIG. 1), a grind element to grind and deliver ground material to the filter holder 30 (FIG. 9), and a brew cycle, as described further herein.

Continuing to refer to FIG. 10, the apparatus 300 includes two nozzles 50a each corresponding to one of the integrated single serve apparatus 100. Nozzles 50a are shown fixed relative to the lower portion 350 of the apparatus 300 for illustrative purposes only. However, it will be understood that apparatus 300 can comprise any of the embodiments described herein for nozzles 50.

Various methods can be employed to brew a beverage using embodiments of the beverage brewing apparatus described herein and shown in the figures. In an embodiment, a beverage can be brewed using the following elements: positioning a filter within the filter holder; engaging the filter holder with the filter engagement portion of the support member; delivering a fluid into the filter holder from the nozzle such that the fluid contacts the filter; and moving at least one of the nozzle and the filter holder engagement portion with respect to each other, such that the fluid contacting the filter forms a flowpath along a surface of the filter.

In some embodiments, the moving element comprises rotating the filter holder engagement portion, to thereby rotate the filter.

In some embodiments, the moving element is such that the flowpath forms a substantially curved shape. In some embodiments, the flowpath forms a substantially spiral or coil-like shape. In some embodiments, the moving element also includes relative movement between the nozzle and the rotating filter holder engagement portion, such that the flowpath moves in and out radially along the rotating filter, adding a wave component to the annular flowpath (FIG. 7B), or a simple spiral shape (FIG. 7A).

In some embodiments, the moving element is such that the flowpath includes a portion offset from the center of the filter.

In some embodiments, the moving element comprises reciprocating the at least one of the nozzle and the filter holder engagement portion with respect to the other of the nozzle and the filter holder engagement portion.

In some embodiments, the moving element comprises moving both the nozzle and the filter holder engagement portion with respect to the body.

In some embodiments, the moving element comprises rotating the filter holder engagement portion. In some embodiments, the moving element further comprises manually moving the filter holder engagement portion. In some embodiments, the moving element further comprises automatically moving the filter holder engagement portion. In some embodiments, the moving element further comprises linearly moving the nozzle with respect to the support member. In some embodiments, the moving element further comprises manually moving the nozzle. In some embodiments, the moving element further comprises automatically moving the nozzle. In some embodiments, the moving element further comprises reciprocating the nozzle.

In some embodiments, the delivering a fluid to the filter holder element comprises rinsing the filter at a first flow rate. In some embodiments, the delivering element further comprises placing coffee grounds into the filter after the rinsing element, and delivering a fluid to the filter holder at a second flow rate, wherein the second flow rate is less than the first flow rate.

In some embodiments, the method further comprises retracting the at least one of the nozzle and the filter holder engagement portion to provide access to the filter holder engagement portion and filter by a user.

In some embodiments, the method further comprises placing coffee grounds into the filter prior to the delivering element. In some embodiments, the delivering element comprises delivering a first predetermined quantity of fluid to the filter holder and waiting for a predetermined period of time prior to delivering a second predetermined quantity of fluid to the filter holder.

In some embodiments, the method further comprises providing a control system that provides a signal to the one or more movable elements, and wherein moving comprises moving the at least one of the nozzle and the filter holder engagement portion in response to the signal.

In an embodiment, a beverage can be brewed using apparatus 100 and using a method comprising the following elements: positioning a filter within the filter holder, engaging the filter holder with the filter engagement portion of the support member, and delivering a fluid into the filter holder from the nozzle such that the fluid contacts the filter. The delivering element comprises delivering a first predetermined quantity of fluid to the holder. The delivering element further comprises waiting for a predetermined period of time, and then delivering a second predetermined quantity of fluid to the filter holder. In some embodiments, the method further comprises adding beverage material to the filter.

In an illustrative embodiment, a 12-fluid ounce beverage can be brewed using apparatus 100 shown in FIG. 1 and using a method comprising the following elements: positioning a filter within the filter holder, engaging the filter holder with the filter engagement portion of the support member, and adding beverage material to the filter. The method further comprises a pre-infusion element comprising delivering a first predetermined quantity of fluid into the filter holder from the nozzle such that the fluid contacts the filter and the beverage material. In an embodiment, the first predetermined quantity of fluid comprises 4 fluid ounces of fluid. The method further comprises waiting for a first predetermined period of time for the first predetermined quantity of fluid to pre-infuse the filter and the beverage material, and to allow at least a portion of the first predetermined quantity of fluid to flow through the filter. In one embodiment, the first predetermined period of time is 45 seconds. The method further comprises delivering a second predetermined quantity of fluid into the filter holder from the nozzle. In one embodiment, the second predetermined quantity of fluid comprises 0.3 fluid ounces of fluid. The method further comprises waiting for a second predetermined period of time for at least a portion of the second predetermined quantity of fluid to contact the beverage material and flow through the filter. In one embodiment, the second predetermined period of time is 3 seconds.

In this illustrative embodiment, the method can further comprise repeating the element "delivering a second predetermined quantity of fluid" and "waiting for a second predetermined period of time" for third, fourth, fifth, sixth, and seventh portions of fluid and periods of time, wherein each of the third through seventh portions of fluid comprises 0.3 ounces, and each of the third through seventh periods of time comprises 3 seconds.

In this illustrative embodiment, the method can further comprise delivering an eighth predetermined quantity of fluid into the filter holder. In one embodiment, the eighth predetermined quantity of fluid comprises 6.8 fluid ounces. In this illustrative embodiment, the method can further comprise waiting an eighth predetermined period of time for the eighth predetermined quantity of fluid, and any remaining fluid in the filter holder that is not held in water tension to the beverage material and/or the filter, to flow through the filter holder. In one embodiment, the eighth predetermined period of time is 60 seconds. In some embodiments, the method further comprises moving at least one of the nozzle and the filter holder engagement portion with respect to each other, such that the fluid contacting the filter forms a flowpath along a surface of the filter during one or more of the above elements. In some embodiments, one or more of the delivering predetermined quantity of fluid elements can further comprise moving at least one of the nozzle and the filter holder engagement portion with respect to each other such that the fluid contacting the filter forms a flowpath along a surface of the filter.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of using a beverage brewing apparatus, comprising:
   providing a beverage brewing apparatus that comprises:
      a body;
      a support member engaged with the body, the support member comprising a filter holder engagement portion configured to engage with a filter holder, wherein a filter is positioned within the filter holder; and a nozzle configured to deliver a fluid into the filter holder;

delivering a fluid into the filter holder from the nozzle;

providing one or more movable elements configured such that at least one of the nozzle and the filter holder engagement portion can move with respect to the other of the nozzle and the filter holder engagement portion;

wherein delivering comprises first delivering fluid to the center of the filter, and moving comprises moving the at least one of the nozzle and the filter holder engagement portion with respect to the other of the nozzle and the filter holder engagement portion such that the fluid forms a flowpath pattern over the filter and forms a substantially curved shape, such that the flowpath forms a substantially spiral or coil-like shape extending outwardly from the center of the filter.

2. The method of claim 1, wherein moving comprises rotating the at least one of the nozzle and the filter holder engagement portion with respect to the other of the nozzle and the filter holder engagement portion.

3. The method of claim 1, wherein moving comprises pivoting the nozzle with respect to the filter holder engagement portion.

4. The method of claim 1, further comprising retracting the at least one of the nozzle and the filter holder engagement portion to provide access to the filter holder engagement portion and filter by a user.

5. The method of claim 1, further comprising placing coffee grounds into the filter prior to the delivering step.

6. The method of claim 5, wherein delivering comprises delivering a first predetermined quantity of fluid to the filter holder and waiting for a predetermined period of time wherein no fluid is delivered, prior to delivering a second predetermined quantity of fluid to the filter holder.

7. A method of using a beverage brewing apparatus, comprising:

providing a beverage brewing apparatus that comprises:
a body;
a support member engaged with the body, the support member comprising a filter holder engagement portion configured to engage with a filter holder, wherein a filter is positioned within the filter holder; and
a nozzle configured to deliver a fluid into the filter holder;

delivering a fluid into the filter holder from the nozzle;

providing one or more movable elements configured such that at least one of the nozzle and the filter holder engagement portion can move with respect to the other of the nozzle and the filter holder engagement portion; and moving the at least one of the nozzle and the filter holder engagement portion with respect to the other of the nozzle and the filter holder engagement portion, such that the fluid forms a flowpath pattern over the filter, wherein moving comprises rotating and manually moving the filter holder engagement portion.

8. A method of using a beverage brewing apparatus, comprising:

providing a beverage brewing apparatus that comprises:
a body;
a support member engaged with the body, the support member comprising a filter holder engagement portion configured to engage with a filter holder, wherein a filter is positioned within the filter holder; and
a nozzle configured to deliver a fluid into the filter holder;

delivering a fluid into the filter holder from the nozzle;

providing one or more movable elements configured such that at least one of the nozzle and the filter holder engagement portion can move with respect to the other of the nozzle and the filter holder engagement portion; and moving the nozzle in a first direction and a second direction with respect to the filter holder engagement portion such that the fluid forms a flowpath pattern over the filter, wherein the first and the second directions are substantially non-collinear with respect to each other.

9. The method of claim 8, wherein moving the nozzle in the first direction comprising moving the nozzle in a first linear direction, and moving the nozzle in the second direction comprises moving the nozzle in a second linear direction, wherein the first and second linear directions are approximately orthogonal to each other.

10. The method of claim 8, wherein delivering a fluid to the filter holder comprises rinsing the filter at a first flow rate.

11. The method of claim 10, further comprising placing coffee grounds into the filter after the rinsing step, and delivering a fluid to the filter holder at a second flow rate, wherein the second flow rate is less than the first flow rate.

12. The method of claim 8, wherein moving comprises moving the at least one of the nozzle and the filter holder engagement portion with respect to the other of the nozzle and the filter holder engagement portion such that the flowpath forms a substantially curved shape.

13. The method of claim 8, wherein moving comprises moving the at least one of the nozzle and the filter holder engagement portion with respect to the other of the nozzle and the filter holder engagement portion such that the flowpath includes a portion offset from the center of the filter.

14. The method of claim 13, wherein moving comprises moving the nozzle linearly with respect to the filter holder engagement portion such that substantially the entirety of the flowpath is laterally offset from the center of the filter.

15. The method of claim 12, wherein moving comprises moving the at least one of the nozzle and the filter holder engagement portion with respect to the other of the nozzle and the filter holder engagement portion such that the flowpath forms a substantially spiral or coil-like shape.

16. The method of claim 8, wherein moving comprises reciprocating the at least one of the nozzle and the filter holder engagement portion with respect to the other of the nozzle and the filter holder engagement portion.

17. The method of claim 8, wherein moving comprises moving both the nozzle and the filter holder engagement portion with respect to the body.

18. The method of claim 8, wherein moving comprises rotating the filter holder engagement portion.

19. The method of claim 18, wherein moving comprises automatically moving the filter holder engagement portion.

20. The method of claim 19, wherein moving further comprises linearly moving the nozzle with respect to the support member.

21. The method of claim 20, wherein moving further comprises manually moving the nozzle.

22. The method of claim 20, wherein moving further comprises automatically moving the nozzle.

23. The method of claim 20, wherein moving further comprises reciprocating the nozzle.

24. The method of claim 8, further comprising providing a control system that provides a signal to the one or more movable elements, and wherein moving comprises moving the at least one of the nozzle and the filter holder engagement portion in response to the signal.

25. The method of claim 8, wherein moving comprising moving the nozzle between an extended and retracted position, wherein the apparatus is placed in an enabled state in the extended position and a disabled state in the retracted position.

26. A method of using a beverage brewing apparatus, comprising:
   providing a beverage brewing apparatus that comprises:
      a body;
      a support member engaged with the body, the support member comprising a filter holder engagement portion configured to engage with a filter holder, wherein a filter is positioned within the filter holder; and
      a nozzle configured to deliver a fluid into the filter holder;
   delivering a fluid into the filter holder from the nozzle;
   providing one or more movable elements configured such that at least one of the nozzle and the filter holder engagement portion can move with respect to the other of the nozzle and the filter holder engagement portion; and
   moving the at least one of the nozzle and the filter holder engagement portion with respect to the other of the nozzle and the filter holder engagement portion, such that the fluid forms a flowpath pattern over the filter,
   wherein delivering comprises delivering a first predetermined quantity of fluid to the filter holder and waiting for a predetermined period of time wherein no fluid is delivered, prior to delivering a second predetermined quantity of fluid to the filter holder; and
   wherein moving comprises moving the at least one of the nozzle and the filter holder engagement portion with respect to the other of the nozzle and the filter holder engagement portion, such that the first predetermined quantity of fluid forms a first flowpath pattern relative to the filter, and moving the at least one of the nozzle and the filter holder engagement portion with respect to the other of the nozzle and the filter holder engagement portion, such that the second predetermined quantity of fluid forms a second flowpath pattern over the filter.

27. The method of claim 26, wherein moving comprises the at least one of the nozzle and the filter holder engagement portion with respect to the other of the nozzle and the filter holder engagement portion, such that the first and the second flowpath form substantially different patterns.

\* \* \* \* \*